United States Patent
Kim et al.

(10) Patent No.: US 9,838,126 B2
(45) Date of Patent: Dec. 5, 2017

(54) ANALOG DISTRIBUTED ANTENNA SYSTEM AND ITS OPERATING METHOD

(71) Applicants: KMW U.S.A., INC., Fullerton, CA (US); SK TELESYS CO., LTD., Seongnam (KR)

(72) Inventors: Bung Chul Kim, Glendale, CA (US); Nak Zu E, Fullerton, CA (US); Bo Yong Bae, Irvine, CA (US); Daniel Taeyoon Kim, Cypress, CA (US); Joon Hyong Shim, Yongin (KR); Jong Ho Park, Yongin (KR); Dae Ho Woo, Incheon (KR); Ki Wook Kim, Seoul (KR); Soo Young Choi, Seoul (KR)

(73) Assignees: KMW U.S.A., Inc. CA (US); SK Telesys Co., Ltd. (KR)

( * ) Notice: Subject to any disclaimer, the term of this patent is extended or adjusted under 35 U.S.C. 154(b) by 10 days.

(21) Appl. No.: 15/008,866

(22) Filed: Jan. 28, 2016

(65) Prior Publication Data
US 2017/0054502 A1    Feb. 23, 2017

(30) Foreign Application Priority Data
Aug. 19, 2015 (KR) .................. 10-2015-0116869

(51) Int. Cl.
*H04B 10/2575* (2013.01)
*H01Q 21/28* (2006.01)

(52) U.S. Cl.
CPC ....... *H04B 10/25752* (2013.01); *H01Q 21/28* (2013.01)

(58) Field of Classification Search
CPC ................... H04B 10/25752; H04B 10/25753
See application file for complete search history.

(56) References Cited

U.S. PATENT DOCUMENTS

| | | | | |
|---|---|---|---|---|
| 2014/0003819 A1* | 1/2014 | Cho | ...................... | H04W 72/04 398/96 |
| 2015/0303999 A1* | 10/2015 | Zhuang | .................. | H04B 7/024 370/329 |
| 2015/0365934 A1* | 12/2015 | Liu | ........................ | H04L 5/0039 370/329 |

* cited by examiner

*Primary Examiner* — Dzung Tran
(74) *Attorney, Agent, or Firm* — Harness, Dickey & Pierce, P.L.C.

(57) ABSTRACT

Some embodiments of the present disclosure relate to an analog distributed antenna system, and its operating method, provided with an orthogonal frequency division multiplexing (OFDM) high-speed modem for use in transceiving control signals between a main unit and remote units in order to effectively control the remote units connected to the main unit.

9 Claims, 4 Drawing Sheets

ANALOG DISTRIBUTED ANTENNA SYSTEM AND ITS OPERATING METHOD

RELATED APPLICATIONS

The present application is based on, and claims priority from, Korean Patent Application Number 10-2015-0116869, filed Aug. 19, 2015, the disclosure of which is hereby incorporated by reference herein in its entirety.

TECHNICAL FIELD

Some embodiments of the present disclosure relate to an analog distributed antenna system and an operating method thereof.

BACKGROUND

The statements in this section merely provide background information related to the present disclosure and do not necessarily constitute prior art.

With the development of mobile communication technology in recent times, mobile communication terminals are rapidly becoming popular. In addition, mobile communication systems gradually employ small cells, and there are continuous studies to ensure the quality of mobile communication services anytime and anywhere for the convenience of their subscribers.

Among the technologies for ensuring the quality of the mobile communication services, a distributed antenna system (DAS) operates to reduce the load of neighboring base stations by distributing data to a dedicated base station or low-load base stations.

FIG. 1 is an exemplary diagram of an analog distributed antenna system of the prior art.

As shown in FIG. 1, the conventional analog distributed antenna system is composed of a main unit (HE: Head-end) 100 and one or more remote units (RU: Remote Unit) 110-1 to 110-N. Meanwhile, the conventional analog distributed antenna system includes low-speed FSK modems, and transceives a control signal between the main unit 100 and the remote units 110-1 to 110-N by using the FSK modems. The FSK modem supports a data processing speed of 9.6 kbps. When the FSK modem is used, it takes about 104.2 ms to perform a control operation between the main unit 100 and the remote units 110-1 to 110-N.

A control signal transmission scheme using the low-speed FSK modem suffers from low efficiency in controlling multiple remote units at the same time. Furthermore, the conventional control signal transmission scheme might be able to serve multiple remote units at the same time while implementing such simple control functions as a status inquiry or state checking of the remote units at best, thereby failing to implement the important control functions such as context-based real-time control of the remote units and firmware download.

SUMMARY

In accordance with some embodiments of the present disclosure, a main unit of an analog distributed antenna system includes an interface unit, a control unit, a high-speed modem, a signal coupler and an optical transceiver. The interface unit is configured to receive a radio signal input from a base station. The control unit is configured to generate a control signal for controlling at least one remote unit connected to the main unit. The high-speed modem is configured to RF-modulate the control signal for converting the control signal into an analog RF signal as an output. The signal coupler is configured to generate a combined signal from the radio signal and the analog RF signal. And the optical transceiver is configured to convert the combined signal to an optical signal, and transmit the converted optical signal to the remote unit.

In accordance with some embodiments of the present disclosure, a remote unit of an analog distributed antenna system includes an optical transceiver configured to receive an optical signal transmitted from a main unit, and convert the optical signal into an analog signal as an output, an interface unit configured to analyze the analog signal, classify a control signal band including a control signal for the remote unit and a communication signal band including a radio signal transmitted from a base station, and output, through different output channels, band signals of the respective classified bands, a high-speed modem configured to receive the band signal corresponding to the control signal band, and extract the control signal, and a control unit configured to control the operation of respective components of the remote unit based on the control signal.

In accordance with some embodiments of the present disclosure, an analog distributed antenna system includes a main unit and a plurality of remote units. The main unit is configured to relay a radio signal between a base station and the remote units installed in a service area, and when relaying the radio signal, convert a control signal for controlling the remote units to an RF signal, combine the RF signal and the radio signal into a combined signal and optically transmit the combined signal to the remote units. The plurality of remote units are configured to receive the optically transmitted signal from the main unit, convert the received optical signal into an analog signal, and analyze the analog signal to transmit the radio signal included in the analog signal to a corresponding user terminal and to operate the remote unit based on the control signal included in the analog signal.

In accordance with some embodiments of the present disclosure, a method for operating a main unit of an analog distributed antenna system includes receiving a radio signal input from a base station, generating a control signal for controlling at least one remote unit connected to the main unit, RF modulating the control signal, and converting the control signal into an analog RF signal as an output, generating a combined signal from the radio signal and the analog RF signal, and converting the combined signal to an optical signal and transmitting the converted optical signal to the remote unit.

In accordance with some embodiments of the present disclosure, a method for operating a remote unit of an analog distributed antenna system includes receiving an optical signal transmitted from a main unit, and converting the optical signal into an analog signal as an output, analyzing the analog signal, classifying the analog signal between a control signal band including a control signal for the remote unit and a communication signal band including a radio signal transmitted from a base station, and outputting, through different output channels, band signals of the respective classified bands, receiving a band signal corresponding to the control signal band, and extracting the control signal, and operating the remote unit based on the control signal.

DETAILED DESCRIPTION

Figure 1:
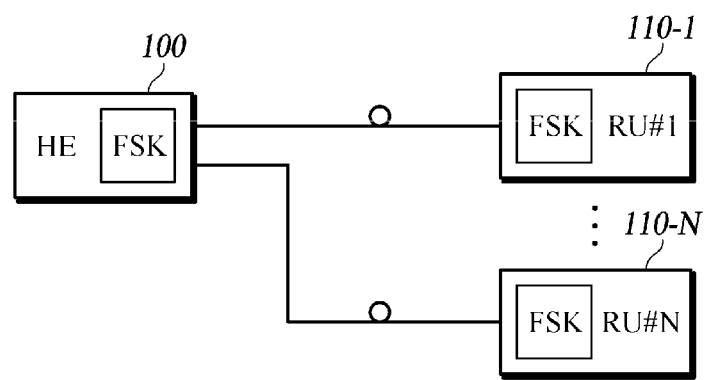
FIG. 1 is an exemplary diagram of an analog distributed antenna system of the prior art.

Some embodiments of the present disclosure provide an analog distributed antenna system which is provided with an orthogonal frequency division multiplexing high-speed modem and transceives a control signal between a main unit and a remote unit using the provided high-speed modem, thereby efficiently controlling a plurality of remote units connected to the main unit.

Hereinafter, some embodiments of the present disclosure will be described in detail with reference to the accompanying drawings. In the following description, like reference numerals designate like elements, although the elements are shown in different drawings. Further, in the following description of the at least one embodiment, a detailed description of known functions and configurations incorporated herein will be omitted for the purpose of clarity and for brevity.

Additionally, in describing the components of the present disclosure, terms like first, second, A, B, (a) and (b) are used. These are solely for the purpose of differentiating one component from another, and one of ordinary skill would understand the terms are not to imply or suggest the substances, the order or sequence of the components. Throughout this specification, when a part "includes" or "comprises" a component, unless there is a particular description contrary thereto, the part can further include other components, not excluding the other components. In addition, terms such as "unit" and "module" indicate a unit for processing at least one function or operation, wherein the unit and the module may be embodied as hardware or software or embodied by combining hardware and software.

In some embodiments, the analog distributed antenna system is provided with an orthogonal frequency division multiplexing high-speed modem and transceives a control signal between the main unit and the remote unit by converting high speed modem's output signal to an optic signal. In particular, the analog distributed antenna system implements an Ethernet-based IP network by assigning a unique IP address to each device provided in the analog distributed antenna system, and performs the status inquiry and control of the remote unit based on an Ethernet communication protocol.

Figure 2:
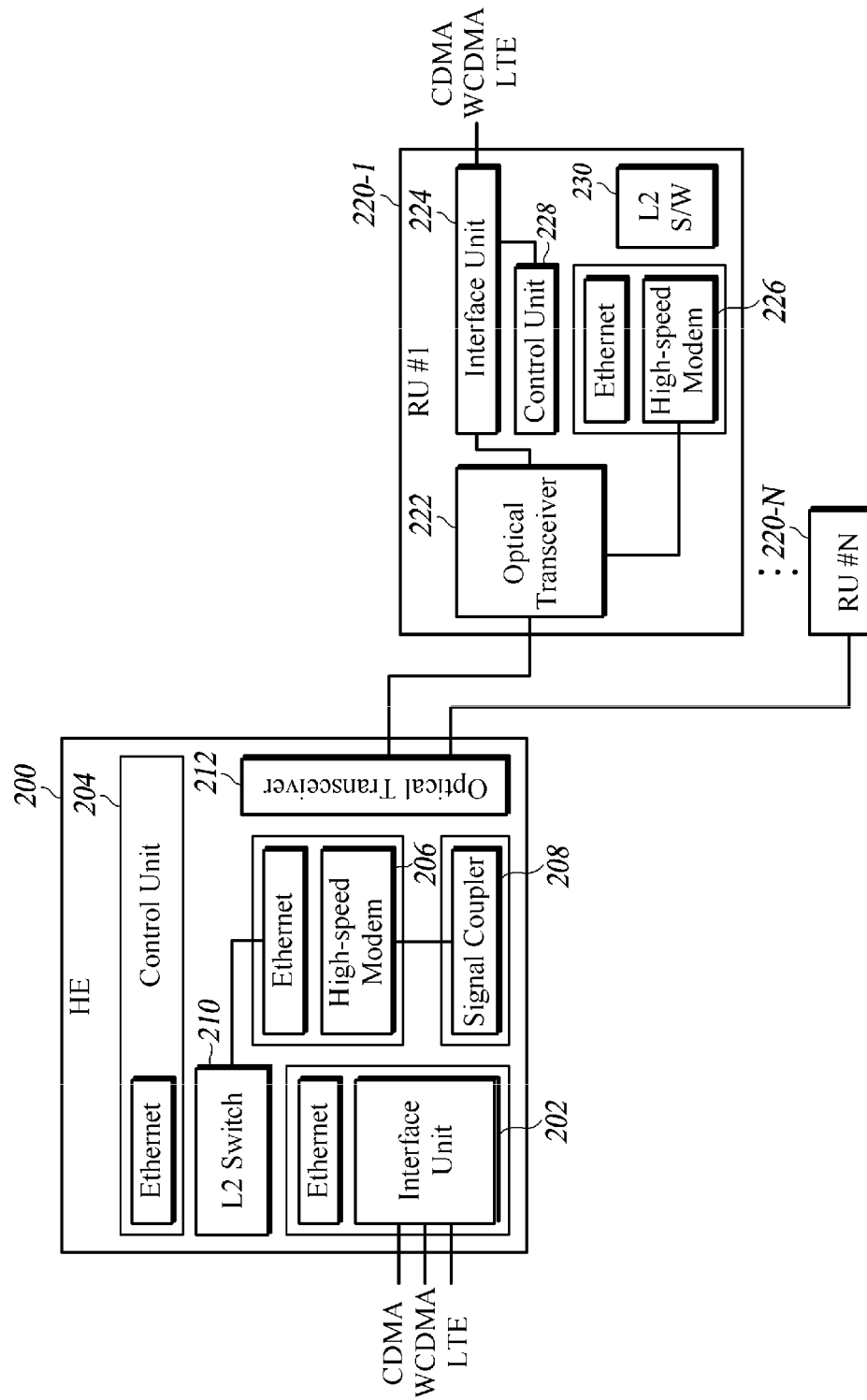
FIG. 2 is an exemplary schematic diagram of an analog distributed antenna system according to some embodiments of the present disclosure.

FIG. 2 is an exemplary schematic diagram of an analog distributed antenna system according to some embodiments of the present disclosure.

As shown in FIG. 2, in some embodiments, the analog distributed antenna system includes a main unit 200 and one or more remote units 220-1 to 220-N. The main unit 200 and the one or more remote units 220-1 to 220-N are connected by a fiber optic cable, and can transceive a data signal with each other via the connected fiber optic cable.

The main unit 200 basically relays a radio signal between a base station and one or more remote units 220-1 to 220-N installed in a service area. Meanwhile, the radio signal can be directly transmitted to the main unit 200 from the base station, and can also be transmitted to the main unit 200 through a radio remote head (RRH) group in which one or more RRHs are concentrated, a Pico BTS, a repeater, etc. For example, when there is an RRH group between the base station and the main unit 200, one or more RRHs included in the RRH group receive a radio signal, which is transmitted from the base station, in the form of an optical signal, convert the received optical signal back into the radio signal, and output the converted radio signal to the main unit 200.

In some embodiments, the main unit 200 is provided with an orthogonal frequency division multiplexing (OFDM) high-speed modem, so that the main unit 200 can simultaneously inquire or control the status of a plurality of remote units 220-1 to 220-N connected to the main unit 200.

The main unit 200 includes an interface unit 202, a control unit 204, a high-speed modem 206, a signal coupler 208, an L2 switch 210 and an optical transceiver 212.

In some embodiments, the main unit 200 performs a downlink process of relaying, to a corresponding user terminal, the radio signal received from the base station, as well as performs an uplink process of relaying, to the base station, the radio signal received from the user terminal at the same time. Meanwhile, referring to FIG. 2, the present description focuses on the downlink process over the downlink process of the main unit 200 to clearly describe the control operation of the one or more remote units 220-1 to 220-N performed by the main unit 200, although it is apparent to those skilled in the art that each component of the main unit 200 can perform the uplink process.

The interface unit 202 receives the radio signal (wireless carrier service provider's) input from the base station, and outputs the received radio signal which has gone through level adjusting and filtering to the signal coupler 208.

The control unit 204 performs the overall control of each component of the main unit 200. In some embodiments, the control unit 204 generates a control signal for controlling the remote units 220-1 to 220-N connected to the main unit 200. The control signal may be a status request command for monitoring the status of the remote units 220-1 to 220-N, and may be a control command for controlling the operations of the remote units 220-1 to 220-N. Meanwhile, in some embodiments, the analog distributed antenna system implements an Ethernet-based IP network by assigning unique IP addresses to the respective components of the main unit 200 and the respective remote units 220-1 to 220-N. Therefore, the control unit 204 generates the control signal for controlling the remote units 220-1 to 220-N connected to the main unit 200, and outputs the generated control signal in the form of an Ethernet protocol based on an Ethernet-based IP communication scheme. To this end, each component of the main unit 200 as well as the control unit 204 has an Ethernet drive for performing Ethernet-based IP communications.

The control unit 204 transmits the control signal after adding the unique IP address of the remote unit corresponding to the control signal to a packet header of the control signal output in the form of an Ethernet protocol.

The high-speed modem 206 RF-modulates the control signal (i.e., Ethernet data signal) in the form of an Ethernet protocol, which is output from the control unit 204, into an analog signal as an output. In some embodiments, the analog distributed antenna system transceives data in the form of an analog signal. Therefore, the high-speed modem 206 modulates or converts the control signal in the form of a digital signal to an analog signal as an output.

In some embodiments, the high-speed modem 206 is provided with a high-speed modem for RF modulating the control signal in the form of an Ethernet protocol, which is from the control unit 204, and outputting the modulated control signal. The high-speed modem is, though not necessarily limited thereto, an OFDM power line communication (PLC) modem.

Meanwhile, the PLC modem is classified as a narrowband communication modem or a wideband communication modem depending on the frequency range of its signals. The narrowband communication modem transmits various control signals at a communication speed of several kbps using a band of about 9 kHz to 450 kHz. The wideband communication modem transmits large amounts of multimedia information such as voice, image and data at a communication speed of several Mbps to hundreds of Mbps using a band of about 1 MHz to 30 MHz. In some embodiments, the high-speed modem 206 is provided with a wideband communication modem as the PLC modem. The provided PLC modem outputs the control signal after modulating the control signal in the form of an Ethernet protocol, which is output from the control unit 204, to the RF signal in a frequency range of 1 to 30 MHz by using an OFDM scheme.

In some embodiments, the high-speed modem 206 is provided with the high-speed PLC modem which can be used to reduce the time required to embark on a control operation between the main unit 200 and the remote units 220-1 to 220-N by outputting the control signal after modulating the control signal to the RF signal. Therefore, in some embodiments, the main unit 200 can additionally perform important control functions such as a real-time control of the remote units 220-1 to 220-N and firmware download as well as simple control functions such as status inquiry of the remote units 220-1 to 220-N. Furthermore, the high-speed modem 206 can solve a network delay caused when a main unit 100 controls a plurality of remote units 110-1 to 110-N using an FSK modem in an analog distributed antenna system of the prior art, by outputting the control signal generated from the control unit 204 after dividing the control signal into a plurality of carrier waves according to the OFDM scheme.

The signal coupler 208 generates a combined signal by combining the radio signal output from the interface unit 202 and the RF signal output from the high-speed modem 206.

The L2 switch 210 checks an IP address of the Ethernet data signal in the form of an Ethernet protocol, and switches the Ethernet data signal to a corresponding module according to the results of checking to enable Ethernet communications between devices.

The optical transceiver 212 electro-optically converts the combined signal generated from the signal coupler 208, and transmits the converted optical signal to the remote units 220-1 to 220-N via an optical cable connected to the optical transceiver 212.

The remote units 220-1 to 220-N refer to devices that receive mobile communication-related services from the base station. The remote units 220-1 to 220-N are installed in a mobile communication service area (indoor or outdoor), and serve to relay the radio signal, which is transmitted from the base station through the main unit 200, to a corresponding user terminal in the mobile communication service area.

In some embodiments, the remote units 220-1 to 220-N receive, from the main unit 200, an optical form of the combined signal of the radio signal from the base station, and the control signal generated from the main unit 200 to control the remote units 220-1 to 220-N. The remote units 220-1 to 220-N distinguish the radio signal and the control signal included in the combined signal before outputting them by using different output channels. The remote units 220-1 to 220-N transmit the radio signal to the corresponding user terminal, and control the operation of each component provided in the remote units 220-1 to 220-N based on the control signal.

In some embodiments, the remote units 220-1 to 220-N are assigned the respective unique IP addresses based on the IP addresses assigned to the components of the main unit 200, which are interlocked with the remote units 220-1 to 220-N, in order to support the Ethernet-based IP communications. In some embodiments, an IP network is used to make access to the respective remote units 220-1 to 220-N from the outside. Thereby, the remote units 220-1 to 220-N can be remotely monitored as well as remotely upgraded in functionality. To this end, the remote units 220-1 to 220-N have an Ethernet drive for the Ethernet-based IP communications.

The remote units 220-1 to 220-N, each includes an optical transceiver 222, an interface unit 224, a high-speed modem 226, a control unit 228 and an L2 switch 230.

The optical transceiver 222 receives the optical signal transmitted from the main unit 200, and outputs the analog signal (i.e., combined signal) by photoelectrically converting the received optical signal.

The interface unit 224 analyzes the analog signals output from the optical transceiver 222 to classify them into a control signal band composed of the control signals for the remote units 220-1 to 220-N and a communication signal band composed of the radio signals transmitted from the base station. The interface unit 224 can classify the analog signals into the control signal band and the communication signal band by analyzing the frequency characteristics of the analog signals.

The interface unit 224 outputs band signals of the respective classified bands over the different output channels. For example, the interface unit 224 outputs the band signal corresponding to the communication signal band to an antenna unit (not shown), and outputs the band signal corresponding to the control signal band to the high-speed modem 226. Meanwhile, a method performed by the antenna for extracting the radio signal from the band signal corresponding to the communication signal band and transmitting the extracted radio signal to the corresponding user terminal is the same as the known method for relaying the radio signal to the corresponding user terminal in the mobile communication service area by an antenna of the conventional analog distributed antenna system, and a detailed description thereof will be omitted.

The high-speed modem 226 receives the band signal corresponding to the control signal band from the interface unit 224, and extracts the control signal. Meanwhile, in some embodiments, the main unit 200 supports the Ethernet-based IP communications, and outputs the control signal for controlling the remote units 220-1 to 220-N in the form of an Ethernet protocol. Therefore, the high-speed modem 226 extracts the control signal in the form of an Ethernet protocol by analyzing the band signal corresponding to the control signal band, and transmits the extracted control signal to the control unit 228. The high-speed modem 226 digitally converts and transmits the control signal to the control unit 228.

In some embodiments, the high-speed modem 226 is provided with a high-speed modem for receiving the band signal corresponding to the control signal band. The high-speed modem is, though not necessarily limited thereto, an OFDM PLC modem.

In some embodiments, the high-speed modem 226 is provided with a wideband communication modem as the PLC modem which receives a signal in a frequency range of 1 to 30 MHz included in the analog signals output from the optical transceiver 222 at a communication speed of several Mbps to hundreds of Mbps, by using the OFDM scheme. Similarly, in some embodiments, the high-speed modem 226 is provided with a high-speed PLC modem, and can reduce the time required to perform the control operation between the main unit 200 and the remote units 220-1 to 220-N by receiving the control signal for the remote units 220-1 to 220-N through the provided PLC modem.

Upon receiving the result data by the control signal from the control unit 228, the high-speed modem 226 provides the received data to the main unit 200 through the provided high-speed PLC modem. Further, the high-speed modem 226 periodically receives status information about the remote units 220-1 to 220-N, and provides the received information to the main unit 200 through the provided high-speed PLC modem.

The control unit 228 performs the overall control of the respective components of the remote units 220-1 to 220-N. In some embodiments, the control unit 228 controls the operation of each component of the remote units 220-1 to 220-N based on the control signal transmitted through the high-speed modem 226.

The L2 switch 230 checks the IP address of the Ethernet data signal in the form of an Ethernet protocol, and accordingly switches the Ethernet data signal to the corresponding module to enable the Ethernet communications between the devices.

Figure 3:
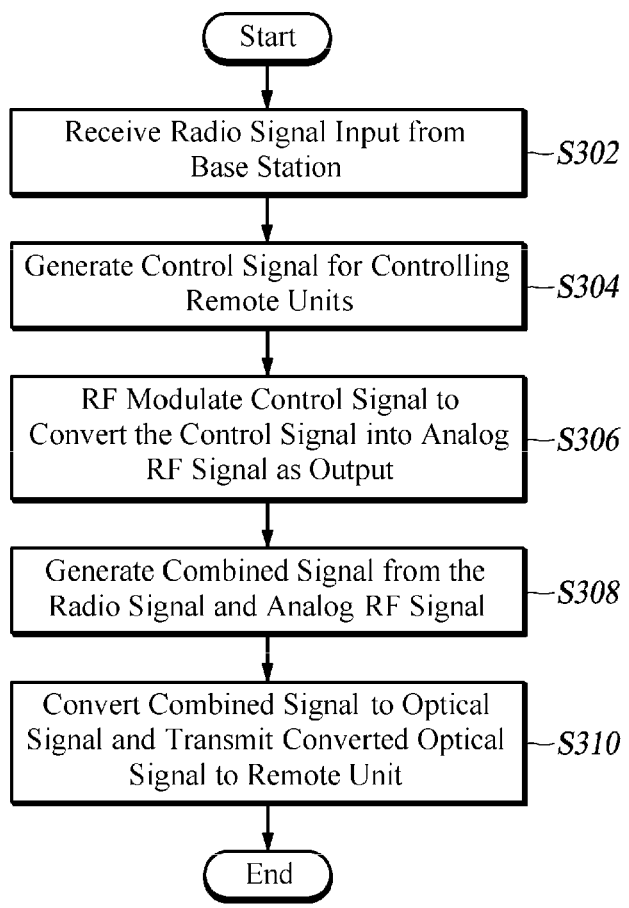
FIG. 3 is an exemplary flowchart of a method for operating a main unit according to some embodiments of the present disclosure.

FIG. 3 is an exemplary flowchart of a method for operating a main unit according to some embodiments of the present disclosure.

The main unit 200 receives a radio signal input from the base station (S302).

The main unit 200 generates a control signal for controlling the remote units 220-1 to 220-N connected to the main unit 200 (S304). In step S304, the main unit 200 generates the control signal for controlling the remote units 220-1 to 220-N connected to the main unit 200, and outputs the generated control signal in the form of an Ethernet protocol based on the Ethernet-based IP communication scheme.

The main unit 200 RF-modulates the control signal generated in step S304 to convert the control signal into an analog signal as an output (S306). In step S306, the main unit 200 modulates the control signal in the form of an Ethernet protocol, which is output in step S304, to the RF signal by using the high-speed PLC modem mounted in the main unit 200, and outputs the modulated control signal. Here, the PLC modem modulates the control signal in the form of an Ethernet protocol, which is output in step S304, to the RF signal in a frequency range of 1 to 30 MHz by using the OFDM scheme, and outputs the modulated control signal.

The main unit 200 generates a combined signal by combining the radio signal received in step S302 and the RF signal output in step S306 (S308).

The main unit 200 electro-optically converts the combined signal generated in step S308, and transmits the converted optical signal to the remote units 220-1 to 220-N via the optical cable connected to the main unit 200.

Here, steps S302 to S308 respectively correspond to the above-described operations of the interface unit 202, the control unit 204, the high-speed modem 206, the signal coupler 208 and the optical transceiver 210 of the main unit 200, and a more detailed description will be omitted.

Figure 4:
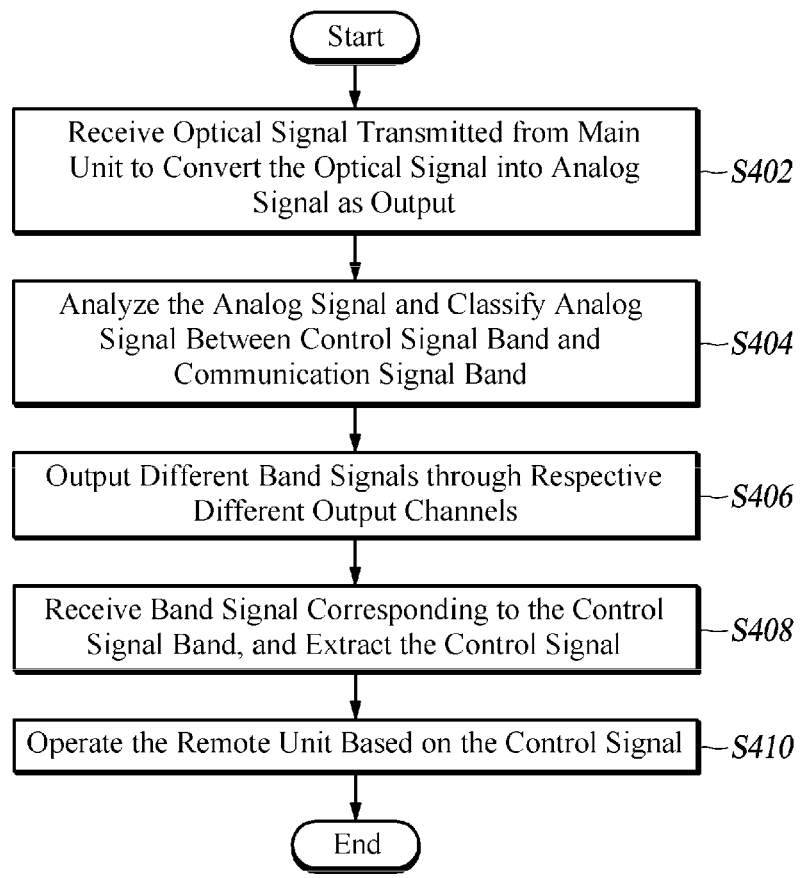
FIG. 4 is an exemplary flowchart of a method for operating a remote unit according to some embodiments of the present disclosure.

FIG. 4 is an exemplary flowchart of a method for operating a remote unit according to some embodiments of the present disclosure.

The remote units 220-1 to 220-N receive the optical signal transmitted from the main unit 200, and photoelectrically convert the received optical signal to output an analog signal (S402).

The remote units 220-1 to 220-N analyze the analog signal outputs in step S402 to classify them into a control signal band composed of the control signals for the remote units 220-1 to 220-N and a communication signal band composed of the radio signals transmitted from the base station (S404).

The remote units 220-1 to 220-N output band signals of the respective bands classified in step S404 over the different output channels (S406).

The remote units 220-1 to 220-N receive the band signals corresponding to the control signal band, and extract the control signals (S408). In step S408, the remote units 220-1 to 220-N receive the band signals corresponding to the control signal band through the high-speed PLC modem installed in the remote units 220-1 to 220-N. The PLC modem receives the band signals in a frequency range of 1 to 30 MHz included in the analog signal outputs in step S402 at a communication speed of several Mbps to hundreds of Mbps, by using the OFDM scheme. The remote units 220-1 to 220-N extract the control signal in the form of an Ethernet protocol by analyzing the band signals corresponding to the control signal band.

The remote units 220-1 to 220-N control the operation of each component of the remote units 220-1 to 220-N based on the control signal extracted in step S408 (S410).

Here, steps S402 to S410 respectively correspond to the above-described operations of the optical transceiver 222, the interface unit 224, the high-speed modem 226 and the control unit 228 of the remote units 220-1 to 220-N, and a more detailed description will be omitted.

According to some embodiments as described above, the analog distributed antenna system is provided with the OFDM high-speed modem and transceives the control signal between the main unit and the remote units through the provided high-speed modem, thereby solving a network delay with the conventional analog distributed antenna system when the main unit controls a plurality of remote units.

In addition, according to some embodiments as described above, the analog distributed antenna system implements the Ethernet-based IP network by assigning the unique IP addresses to the respective components of the main unit and one or more of the respective remote units, thereby enabling control functions, such as a remote status monitoring and a remotely upgrading of functionality for the remote units.

Further, according to some embodiments as described above, equipment operation, waveforms, etc. can be monitored in real time, and various additional functions can be provided.

Although exemplary embodiments of the present disclosure have been described for illustrative purposes, those skilled in the art will appreciate that various modifications, additions and substitutions are possible, without departing from the various characteristics of the disclosure. Therefore, exemplary embodiments of the present disclosure have been described for the sake of brevity and clarity. Accordingly, one of ordinary skill would understand the scope of the disclosure is not limited by the explicitly described above embodiments but by the claims and equivalents thereof.

The invention claimed is:

1. A main unit of an analog distributed antenna system, the main unit comprising:
   an interface unit configured to receive a radio signal input from a base station;
   a control unit configured to generate a control signal for controlling at least one remote unit connected to the main unit;
   a power line communication (PLC) modem configured to modulate the control signal based on an orthogonal frequency division multiplexing (OFDM) scheme to output an analog RF signal in a frequency range of 1 to 30 MHz;
   a signal coupler configured to generate a combined signal from the radio signal and the analog RF signal; and
   an optical transceiver configured to convert the combined signal to an optical signal and transmit a converted optical signal to the remote unit.

2. The main unit of claim 1, which is configured to support Ethernet-based Internet protocol (IP) communications with unique IP addresses assigned to respective components of the main unit, and
   wherein the control unit is configured to transmit the control signal in the form of an Ethernet protocol to the PLC modem based on a scheme of the Ethernet-based IP communications.

3. A remote unit of an analog distributed antenna system, the remote unit comprising:
   an optical transceiver configured to receive an optical signal transmitted from a main unit, and convert the optical signal into an analog signal as an output;
   an interface unit configured to analyze the analog signal, classify a control signal band including a control signal for the remote unit and a communication signal band including a radio signal transmitted from a base station, and output, through different output channels, band signals of the respective classified bands;
   a power line communication (PLC) modem configured to receive a signal in a frequency range of 1 to 30 MHz, corresponding to the control signal band included in the analog signal, and extract the control signal in the form of an Ethernet protocol from the signal in the frequency range; and
   a control unit configured to control the operation of respective components of the remote unit based on the control signal.

4. The remote unit of claim 3, which is configured to support Ethernet-based Internet protocol (IP) communications with a unique IP address assigned based on an IP address which is interlocked with the remote unit and assigned to a component of the main unit.

5. An analog distributed antenna system, comprising:
   a main unit configured to relay a radio signal between a base station and a plurality of remote units installed in a service area, and when relaying the radio signal, convert a control signal for controlling the remote units to an RF signal, combine the RF signal and the radio signal into a combined signal and optically transmit the combined signal to the remote units; and
   one or more of the remote units configured to receive the optically transmitted signal from the main unit, convert the received optical signal into an analog signal, and analyze the analog signal to transmit the radio signal included in the analog signal to a corresponding user terminal and to operate the remote unit based on the control signal included in the analog signal,
   wherein the main unit comprises a first power line communication (PLC) modem configured to modulate the control signal based on an orthogonal frequency division multiplexing (OFDM) scheme to output the RF signal in a frequency range of 1 to 30 MHz.

6. The analog distributed antenna system of claim 5, wherein the components of the main unit and the one or more of the remote units are respectively assigned unique IP addresses to support Ethernet-based Internet protocol (IP) communications.

7. The analog distributed antenna system of claim 5, wherein the remote unit comprises:
   a second power line communication (PLC) modem configured to receive a signal in a frequency range of 1 to 30 MHz, corresponding to the control signal included in the analog signal, and extract the control signal in the form of an Ethernet protocol from the signal in the frequency range.

8. A method for operating a main unit of an analog distributed antenna system, the method comprising:
   receiving a radio signal input from a base station;
   generating a control signal for controlling at least one remote unit connected to the main unit;
   by using a power line communication modem, modulate the control signal based on an orthogonal frequency division multiplexing (OFDM) scheme to output an analog RF signal in a frequency range of 1 to 30 MHz;
   generating a combined signal from the radio signal and the analog RF signal; and
   converting the combined signal to an optical signal and transmitting a converted optical signal to the remote unit.

9. A method for operating a remote unit of an analog distributed antenna system, the method comprising:
   receiving an optical signal transmitted from a main unit, and converting the optical signal into an analog signal as an output;
   analyzing the analog signal, classifying the analog signal between a control signal band including a control signal for the remote unit and a communication signal band including a radio signal transmitted from a base station, and outputting, through different output channels, band signals of the respective classified bands;
   by using a power line communication modem, extracting the control signal in the form of an Ethernet protocol from a signal in a frequency range of 1 to 30 MHz, the signal in the frequency range corresponding to the control signal band included in the analog signal; and
   operating the remote unit based on the control signal.

* * * * *